US011409382B2

(12) United States Patent
Baek et al.

(10) Patent No.: US 11,409,382 B2
(45) Date of Patent: Aug. 9, 2022

(54) ELECTRONIC DEVICE AND METHOD FOR CONTROLLING BIOSENSOR LINKED WITH DISPLAY BY USING SAME

(71) Applicant: Samsung Electronics Co., Ltd., Gyeonggi-do (KR)

(72) Inventors: Seunggeol Baek, Gyeonggi-do (KR); Kyunghoon Song, Gyeonggi-do (KR); Gyusang Cho, Gyeonggi-do (KR); Yunjang Jin, Gyeonggi-do (KR); Kwangsub Lee, Gyeonggi-do (KR); Seyoung Jang, Gyeonggi-do (KR); Heungsik Shin, Gyeonggi-do (KR); Chihyun Cho, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/481,546

(22) PCT Filed: Jan. 30, 2018

(86) PCT No.: PCT/KR2018/001281
§ 371 (c)(1),
(2) Date: Jul. 29, 2019

(87) PCT Pub. No.: WO2018/143643
PCT Pub. Date: Aug. 9, 2018

(65) Prior Publication Data
US 2020/0026371 A1  Jan. 23, 2020

(30) Foreign Application Priority Data

Jan. 31, 2017 (KR) .................. 10-2017-0013731

(51) Int. Cl.
*G06F 3/041* (2006.01)
*G06F 21/32* (2013.01)
(Continued)

(52) U.S. Cl.
CPC ............ *G06F 3/041* (2013.01); *G06F 3/0304* (2013.01); *G06F 3/0487* (2013.01); *G06F 21/32* (2013.01);
(Continued)

(58) Field of Classification Search
CPC ...... G06F 3/041; G06F 3/0304; G06F 3/0487; G06F 21/32; G06F 21/45; G06F 2200/1634; G06K 9/00087; G06V 40/1365
See application file for complete search history.

(56) References Cited

U.S. PATENT DOCUMENTS

2010/0180136 A1  7/2010 Thompson et al.
2010/0208953 A1  8/2010 Gardner et al.
(Continued)

FOREIGN PATENT DOCUMENTS

EP  2 219 136 A1  2/2010
EP  3 073 792 A1  9/2016
(Continued)

OTHER PUBLICATIONS

European Search Report dated Oct. 7, 2019.
Korean Search Report dated Dec. 2, 2021.

*Primary Examiner* — William Boddie
*Assistant Examiner* — Saifeldin E Elnafia
(74) *Attorney, Agent, or Firm* — Cha & Reiter, LLC

(57) ABSTRACT

Various examples of the present invention relate to a method for controlling a biosensor linked with a display, the method comprising: acquiring an input of a user on the basis of a first region corresponding to the biosensor and a second region which corresponds to a touch sensor and is adjacent to at least a part of the first region; confirming an input shape corresponding to the input of the user; and acquiring, through a control of the biosensor, bio-information corre- (Continued)

sponding to the input of the user when the confirmed input shape satisfies a predetermined condition. Other embodiments are also possible.

12 Claims, 17 Drawing Sheets

(51) Int. Cl.
    *G06F 3/03*     (2006.01)
    *G06F 3/0487*     (2013.01)
    *G06F 21/45*     (2013.01)
    *G06V 40/12*     (2022.01)

(52) U.S. Cl.
    CPC .......... *G06F 21/45* (2013.01); *G06V 40/1365* (2022.01); *G06F 2200/1634* (2013.01)

(56) References Cited

U.S. PATENT DOCUMENTS

| | | |
|---|---|---|
| 2013/0135247 A1 | 5/2013 | Na et al. |
| 2015/0074615 A1 | 3/2015 | Han et al. |
| 2015/0177884 A1 | 6/2015 | Han |
| 2015/0220767 A1 | 8/2015 | Yoon et al. |
| 2015/0235098 A1* | 8/2015 | Lee ................ G06K 9/0002 715/709 |
| 2015/0324569 A1 | 11/2015 | Hong et al. |
| 2016/0148037 A1* | 5/2016 | Baek ............... G06F 3/04166 345/174 |
| 2016/0283022 A1 | 9/2016 | Yang et al. |
| 2016/0350571 A1 | 12/2016 | Han et al. |
| 2016/0350580 A1 | 12/2016 | Pyun et al. |
| 2017/0220838 A1* | 8/2017 | He ..................... G06F 3/044 |
| 2017/0336909 A1* | 11/2017 | Song ................ G06F 3/0446 |
| 2018/0032779 A1* | 2/2018 | Yang ................ G06K 9/0002 |

FOREIGN PATENT DOCUMENTS

| | | |
|---|---|---|
| KR | 10-2008-0020343 A | 3/2008 |
| KR | 10-2010-0094382 A | 8/2010 |
| KR | 10-2013-0057637 A | 6/2013 |
| KR | 10-1529033 B1 | 6/2015 |
| KR | 10-2015-0073539 A | 7/2015 |
| KR | 10-2015-0128873 A | 11/2015 |
| KR | 10-2015-0129383 A | 11/2015 |
| KR | 10-2016-0048215 A | 5/2016 |
| KR | 10-2016-0087266 A | 7/2016 |
| KR | 10-2016-0141180 A | 12/2016 |

* cited by examiner

ELECTRONIC DEVICE AND METHOD FOR CONTROLLING BIOSENSOR LINKED WITH DISPLAY BY USING SAME

CROSS REFERENCE TO RELATED APPLICATIONS

This application is a National Phase Entry of PCT International Application No. PCT/KR2018/001281, which was filed on Jan. 30, 2018, and claims a priority to Korean Patent Application No. 10-2017-0013731, which was filed on Jan. 31, 2017, the contents of which are incorporated herein by reference.

TECHNICAL FIELD

Various embodiments of the disclosure relate to a method for controlling a biosensor associated with a display of an electronic device.

BACKGROUND ART

With the diverse usages of portable electronic devices, there have been increasing concerns about security functions of the portable electronic devices. A portable electronic device may be configured to release a locking function based on a password or a pattern. Recently, a portable electronic device may include a built-in biosensor (e.g., fingerprint sensor or iris sensor), and it may be configured to release a locking function using the biosensor. With the increasing concern about security, a security method based on a biosensor that is difficult to be copied may be used in diverse manners.

A portable electronic device may include a fingerprint sensor that is a kind of biosensors, and it may recognize a users fingerprint through the fingerprint sensor. The portable electronic device may perform user authentication using the fingerprint sensor.

DISCLOSURE OF INVENTION

Technical Problem

A role of a portable electronic device as a display has become important, and there is a trend that the size of such a display is gradually increased. Accordingly, it may be considered that a biosensor (e.g., fingerprint sensor), which has been provided separately from a display on a portable electronic device, is built in the portable electronic device. A portable electronic device may have a built-in fingerprint sensor, and a part of a display region of a display may be configured as a fingerprint sensing region for recognizing the fingerprint. In the portable electronic device, the fingerprint sensor corresponding to the fingerprint sensing region may be built as a constituent part constituting the display. The fingerprint sensor may operate in association with the display. For example, the fingerprint sensor may be built in a partial region of the display, and a fingerprint recognition region may be formed based on the built-in fingerprint sensor. The portable electronic device may perform user authentication through recognition of a users fingerprint input corresponding to the fingerprint recognition region.

Because the fingerprint recognition region is formed on the partial region of the display, it may be difficult to detect the users fingerprint input on a region of the portable electronic device excluding the fingerprint recognition region.

Various embodiments of the disclosure are to notify a user that a fingerprint input error has occurred with respect to a users fingerprint input onto a region excluding a fingerprint recognition region and to provide a guide to a user for an accurate fingerprint input.

Solution to Problem

According to various embodiments of the disclosure, an electronic device may include a biosensor; a processor, a display panel including a first region corresponding to the biosensor and a touch sensor including a second region formed at least partly adjacent to at least a part of the first region; and one or more control circuits configured to control the touch sensor, wherein the processor is configured to acquire a users input based on the first region and the second region, identify an input shape corresponding to the users input, and acquire biometric information corresponding to the users input through a control of the biosensor if the identified input shape satisfies a designated condition.

According to various embodiments of the disclosure, a method for controlling a biosensor associated with a display may include acquiring a users input based on a first region corresponding to the biosensor and a second region corresponding to a touch sensor and adjacent to at least a part of the first region; identifying an input shape corresponding to the users input; and acquiring biometric information corresponding to the users input through a control of the biosensor if the identified input shape satisfies a designated condition.

Advantageous Effects of Invention

According to the various embodiments of the disclosure, it is possible to determine a partial region of a display of an electronic device as a fingerprint sensing region and to recognize a users fingerprint input based on the fingerprint sensing region. According to the various embodiments of the disclosure, it is possible to form a fingerprint recognition region for recognizing the users fingerprint and a fingerprint error region adjacent to the fingerprint recognition region and to recognize the users fingerprint based on the fingerprint recognition region and the fingerprint error region. According to the various embodiments of the disclosure, it is possible to notify a user that a fingerprint input error has occurred if the users input is detected in the fingerprint error region. According to the various embodiments of the disclosure, it is possible to guide the fingerprint recognition region so that the user can conveniently perform user authentication on the display. According to the various embodiments of the disclosure, user convenience for the user authentication based on the fingerprint sensor can be increased.

MODE FOR THE INVENTION

Figure 1:
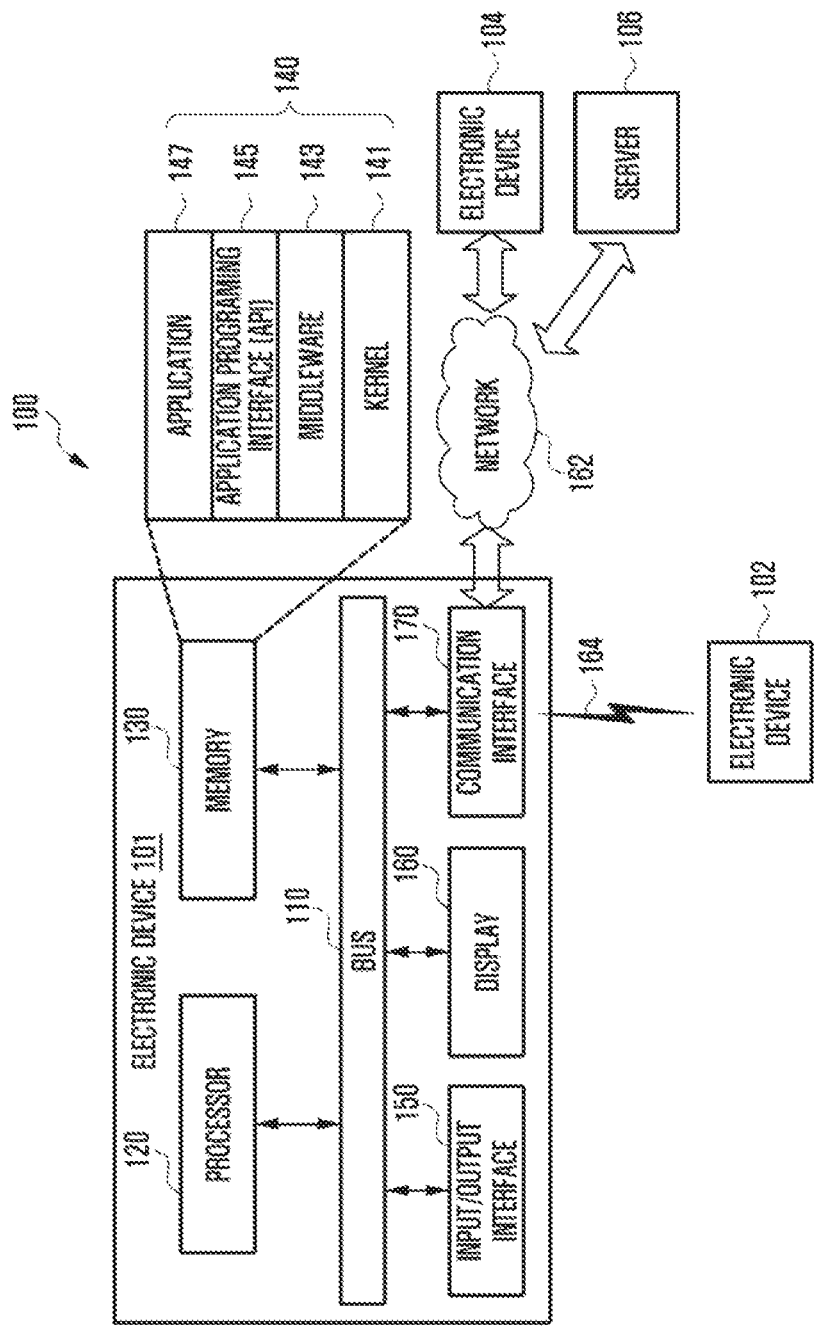
FIG. 1 is a diagram illustrating an electronic device in a network environment according various embodiments of the disclosure.

Hereinafter, the present disclosure is described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a genetic-purpose processor (e.g., CPU or application processor) that may execute one or more software programs stored in a memory device to perform corresponding functions.

It should be appreciated that various embodiments of the present disclosure and the terms used therein are not intended to limit the technological features set forth herein to particular embodiments and include various changes, equivalents, or replacements for a corresponding embodiment. Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An electronic device according to various embodiments of the present invention may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head- Mounted-Device (HMD), such as electronic glasses, electronic clothes, an electronic bracelet, an electronic necklace, an electronic appcessary, an electronic tattoo, and a smart watch).

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), which are equipped with an antenna. The electronic device according to various embodiments of the present invention may also be a combination of the devices listed above. Further, the electronic device according to various embodiments of the present disclosure may be a flexible device. It is apparent to those skilled in the art that the electronic device according to various embodiments of the present invention is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 illustrates a network environment 100 including an electronic device 101 according to various embodiments of the present disclosure.

Referring to FIG. 1, the electronic device 101, 102, 104 may connect to the server 106 via the network 162 or short-wireless communication 164.

The electronic device 101 may include a bus 110, a processor 120, a memory 130, an input/output interface 150, a display 160, and a communication interface 170. According to some embodiments, at least one of the above described components may be omitted from the electronic device 101 or another component may be further included in the electronic device 101. The bus 110 may be a circuit connecting the above described components 120, 130, and 150-170 and transmitting communications (e.g., control messages and/or data) between the above described components. The processor 120 is capable of including one or more of the following: a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS). The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests. The API 145 refers to an interface configured to allow the application programs 147 to control functions provided by the kernel 141 or the middleware 143. The API 145 is capable of including at least one interface or function (e.g., instructions) for file control, window control, image process, text control, or the like. The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a users body.

The communication interface 170 is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 164. Short-wireless communication 164 may include at least one of the following: wireless fidelity (WiFi), LiFi (light fidelity), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
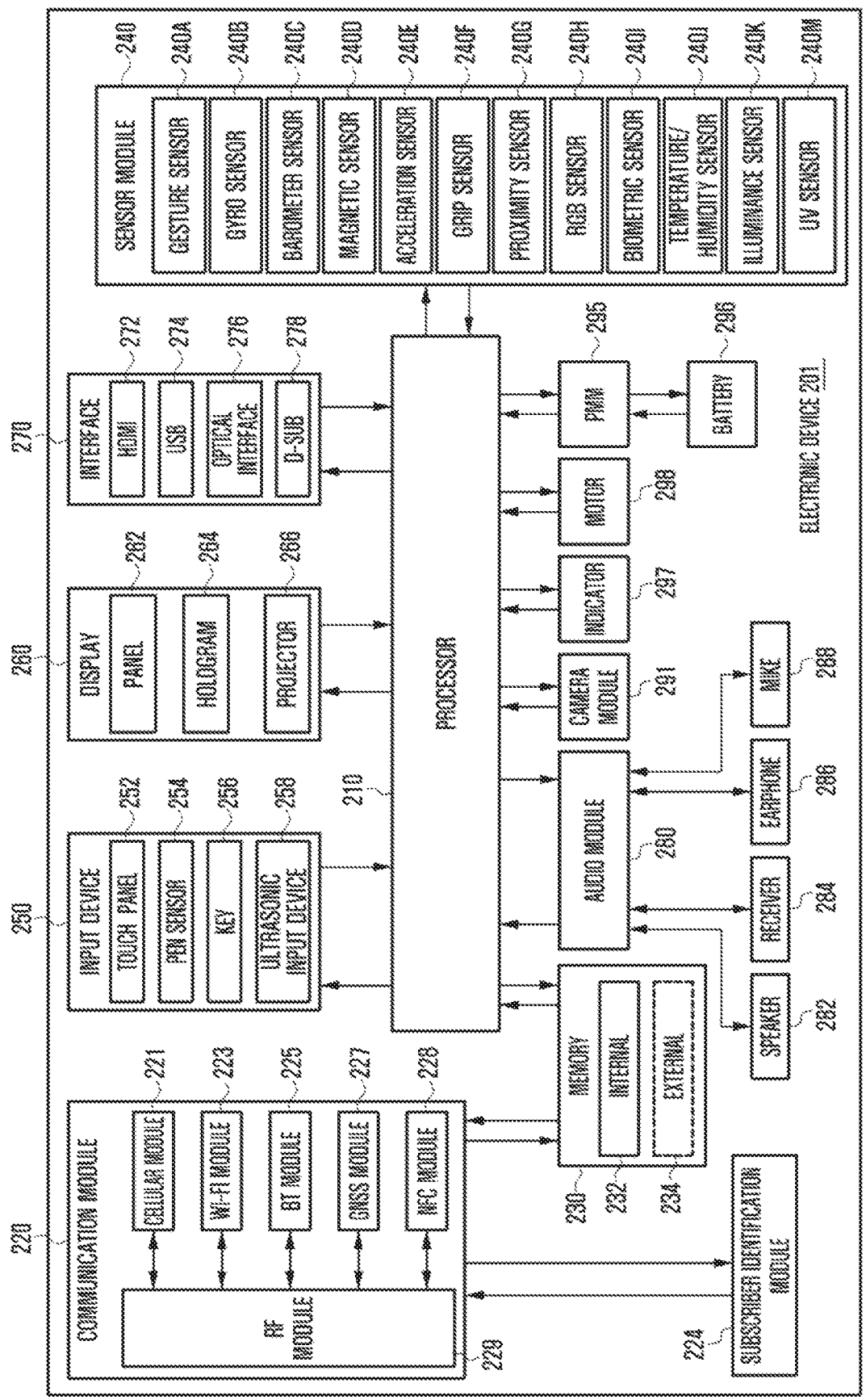
FIG. 2 is a block diagram of an electronic device according to various embodiments of the disclosure.

FIG. 2 is a detailed block diagram showing a configuration of an electronic device 201 according to various embodiments. For example, the electronic device 201 is capable of including part or all of the components in the electronic device 101 shown in FIG. 1. The electronic device 201 is capable of including one or more processors 210 (e.g., Application Processors (APs)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including a cellular module 221, WiFi module 223, Bluetooth (BT) module 225, GNSS module 227 (e.g., a GPS module, Glonass module, Beidou module or Galileo module), NFC module 228, and Radio Frequency (RF) module 229. The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 221 is also capable of including a communication processor (CP). Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module. The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, a ultraviolet (UV) sensor 240M and a finger print sensor 240N. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor and/or an iris sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, a display 260 may include a fingerprint sensor 240N to recognize a users fingerprint. The display 260 may include the fingerprint sensor 240N corresponding to a partial region of a panel 262. The display 260 may configure the partial region of the display 260 as a fingerprint sensing region, and it may recognize the users fingerprint based on the fingerprint sensing region. The fingerprint sensor 240N may be integrally implemented with a touch panel 252, or it may be implemented by one or more sensors separately from the touch panel 252.

The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc. The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc. The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile W. The processing unit for supporting a mobile TV is capable of processing media data pursuant to standards, e.g., digital multimedia broadcasting (DMB), digital video broadcasting (DVB), or MediaFlo™, etc.

Figure 3:
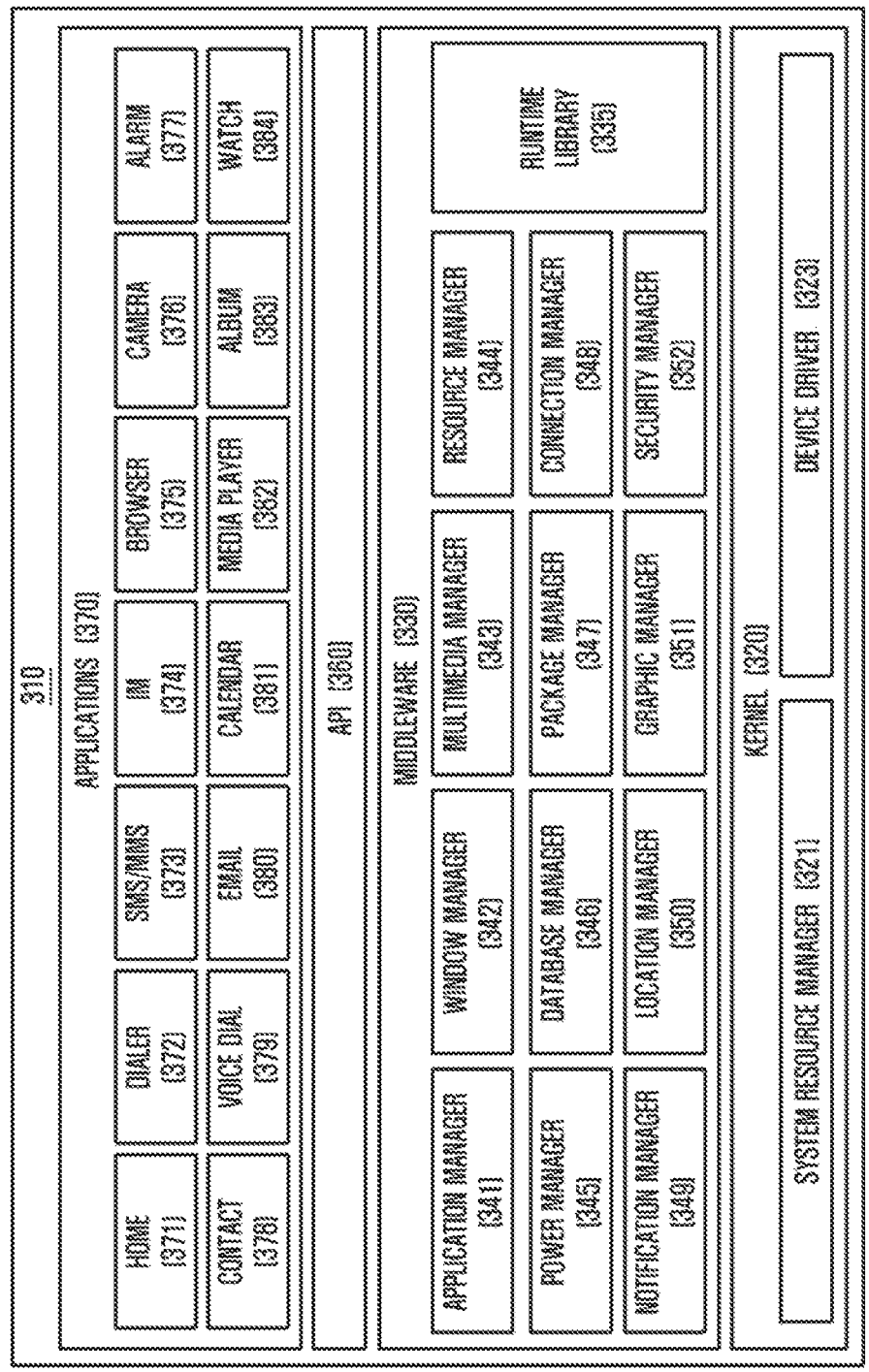
FIG. 3 is a block diagram of a program module according to various embodiment of the disclosure.

FIG. 3 is a block diagram of a programming module according to various embodiments. According to an embodiment, the program module 310 (e.g., program module 140 shown in FIG. 1) is capable of including an operation system (OS) for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc. The program module 310 is capable of including a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device diver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like. The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370. A power manager 345 may manage, for example, a battery capacity, a temperature, or a power, and it may determine or provide power information required for the operation of the electronic device using the corresponding information as described above. The power manager 345 may operate together with a Basic Input/Output System (BIOS). The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function. The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components. The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, diary 372, SMS/MMS 373, instant message (IM) 374, browser 375, camera 376, alarm 377, contact 378, voice dial 379, email 380, calendar 381, media player 382, album 383, dock 384, health care (e.g., an application for measuring amount of exercise, blood sugar level, etc.), and environment information (e.g., an application for providing atmospheric pressure, humidity, temperature, etc.). According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices. For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user. The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc. According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems. According to various embodiments, at least part of the program module 310 can be implemented with software, firmware, hardware, or any combination of two or more of them. At least part of the program module 310 can be implemented (e.g., executed) by a processor (e.g., processor 210). At least part of the programing module 310 may include modules, programs, routines, sets of instructions or processes, etc., in order to perform one or more functions.

Figure 4:
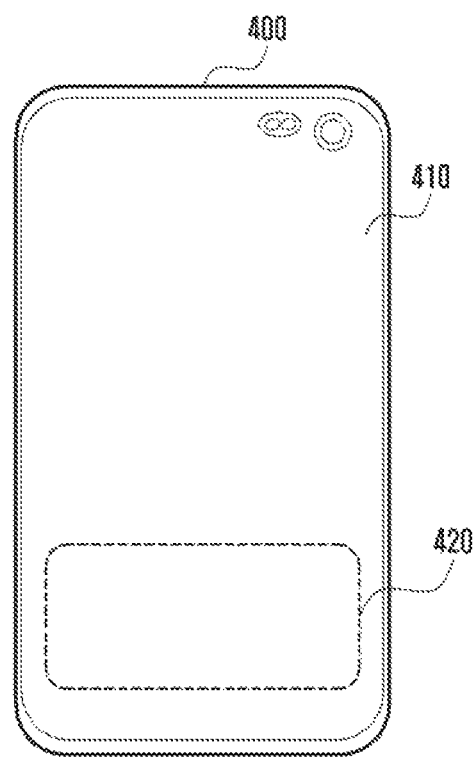
FIG. 4 is a diagram illustrating a structure in which a display is deployed on a front side of an electronic device according to various embodiments of the disclosure.

FIG. 4 is a diagram illustrating a structure in which a display is deployed on a front side of an electronic device according to various embodiments of the disclosure.

An electronic device 400 (e.g., electronic device 101 of FIG. 1) according to various embodiments may include a display 410 (e.g., display 160 of FIG. 1) deployed on the front side of the electronic device 400, and a fingerprint sensor 420 (e.g., biosensor 240I of FIG. 2) built corresponding to a partial region of the display 410. The display 410 may include the fingerprint sensor 420 based on the partial region thereof.

The front side of the electronic device 400 according to various embodiments may be composed of the display 410, and the fingerprint sensor 420 may be configured to be built on a lower portion of the display 410. In the electronic device 400 according to various embodiments, the fingerprint sensor 420 may be included in at least a part of the display 410, and a region occupied by the fingerprint sensor 420 may be formed as a portion of the display 410 to extend the size of the display.

Figure 5:
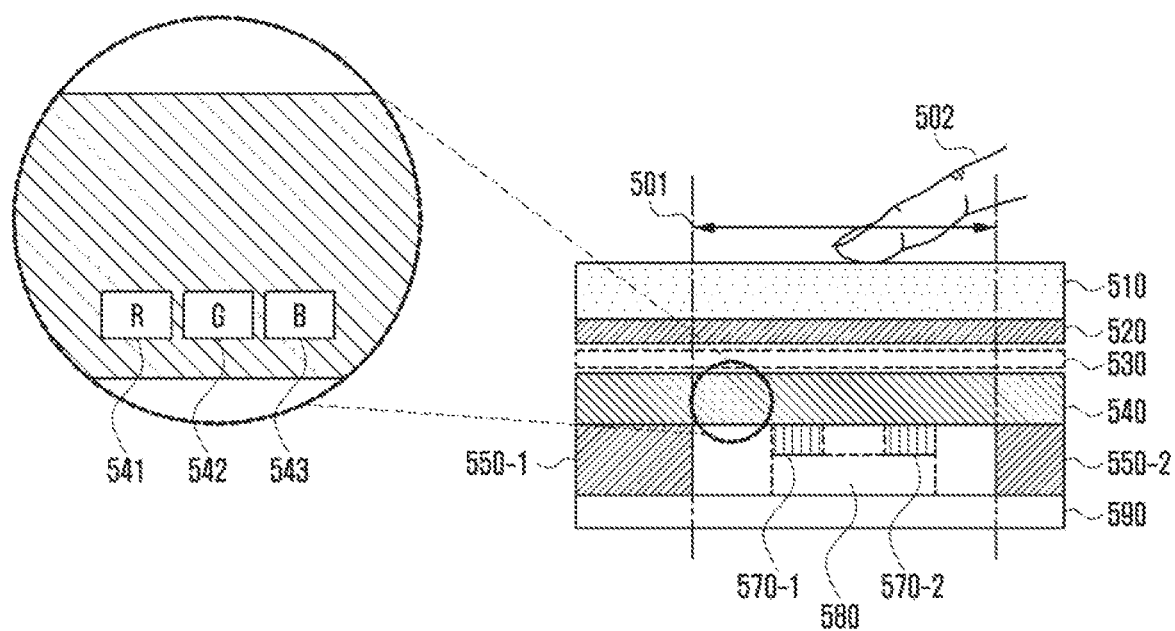
FIG. 5 is a diagram illustrating a structure in which a fingerprint sensor is built in a display of an electronic device according to various embodiments of the disclosure.

FIG. 5 is a diagram illustrating a structure in which a fingerprint sensor is built in a display of an electronic device according to various embodiments of the disclosure.

With reference to FIG. 5, a structure is illustrated, in which a fingerprint sensor 580 is mounted corresponding to at least a part of a display provided in front of an electronic device. The electronic device may include a glass 510, a touch sensor (e.g., touch detection sensor) 530, a display panel 540 (e.g., panel 262 of FIG. 2), a biosensor 580 (e.g., biosensor 240I or fingerprint sensor 240N of FIG. 2), and a PCB 590. The glass 510 of the electronic device may be attached to the touch sensor 530 or the display panel 540 through adhesives 520. Further, the electronic device may further include structures 550-1 and 550-2 to secure a space for mounting the fingerprint sensor 580 therein. The structures 550-1 and 550-2 may form at least a part of a sealing structure for protecting the fingerprint sensor 580.

According to various embodiments, the touch sensor 530 may be formed on a partial region (e.g., one region or a plurality of regions) of the display or the whole region of the display.

According to various embodiments, the touch sensor 530 may be formed on one side of the display panel 540 (e.g., a separate layer 530 on one surface of the display or at least a partial region of a surface on which pixels 541 to 543 of the display panel are formed) to detect a users touch input. According to various embodiments, the fingerprint sensor 580 may be formed on the other side (e.g., rear side) of the display panel 540. The touch sensor 530 and the fingerprint sensor 580 may include, for example, an optical image sensor, an ultrasonic transmission/reception module, or a capacitive transmission/reception electrode pattern.

According to various embodiments, the touch sensor 530 may be deployed between the adhesives 520 and the display panel 540 or may be deployed between the glass 510 and the adhesive layer 520. The touch sensor 530 may be formed as a capacitive transmission/reception electrode pattern, and it may be formed as a transparent electrode to heighten permeability of light output from the display panel 540.

In the electronic device according to various embodiments, the fingerprint sensor 580 may be deployed on the other side (e.g., rear side) of the display panel 540. Elastic bodies (e.g., sponge or rubber) 570-1 and 570-2 for impact mitigation between the fingerprint sensor 580 and the display panel 540 or for preventing inflow of foreign substances may be formed between the fingerprint sensor 580 and the display panel 540. According to various embodiments, the fingerprint sensor 580 may include an image sensor. For example, the image sensor of the fingerprint sensor 580 may detect light (e.g., visible light, infrared ray, or ultraviolet ray) that is emitted from a light source (e.g., display panel 340 or infrared ray (IR) LED) and then is reflected from a users fingerprint to return to the image sensor. The fingerprint sensor 580 may recognize the users fingerprint based on the light reflected from the users fingerprint.

Figure 6A:
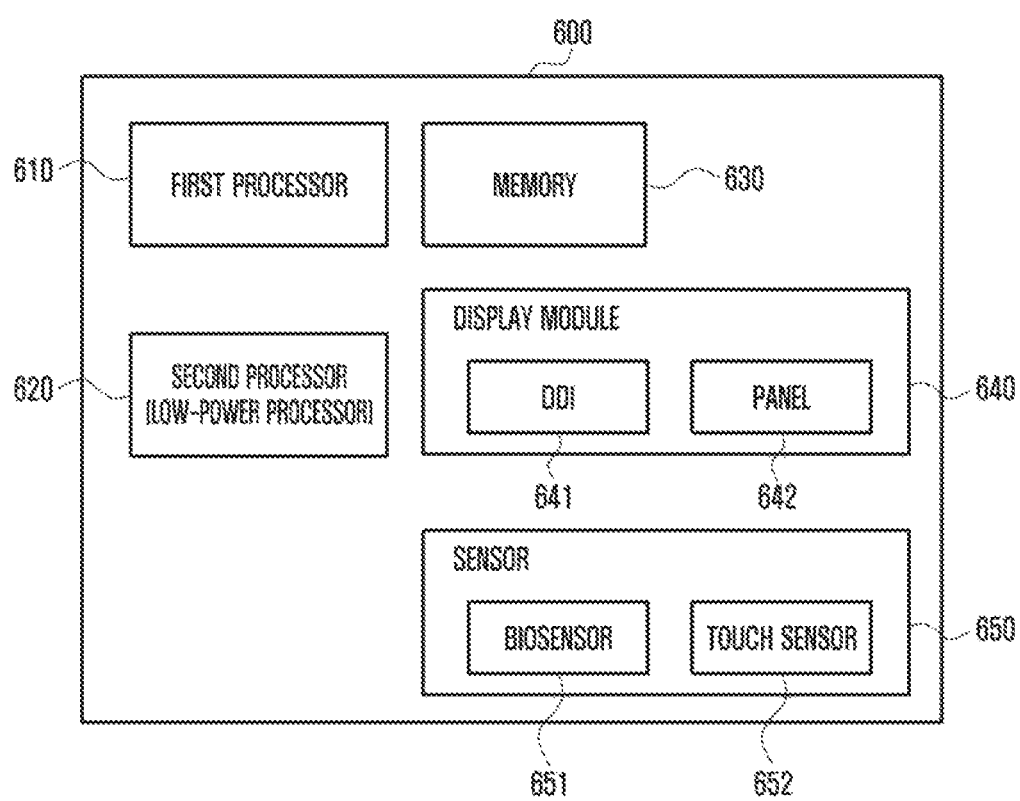
FIG. 6A is a block diagram of constituent parts of an electronic device according to various embodiments of the disclosure.
Figure 6B:
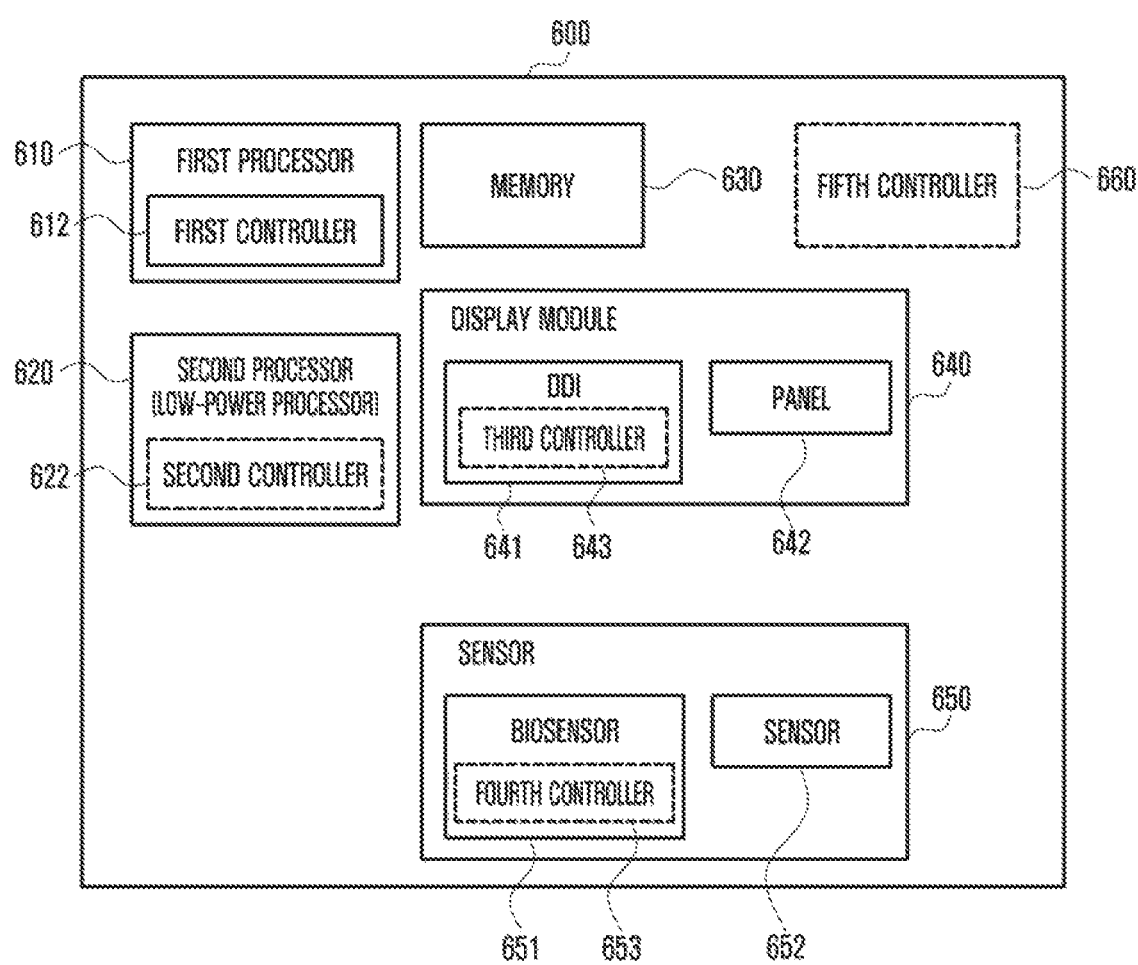
FIG. 6B is a block diagram of constituent parts of an electronic device according to various embodiments of the disclosure.

FIGS. 6A and 6B are block diagrams of constituent parts of an electronic device according to various embodiments of the disclosure.

FIG. 6A illustrates an example of an electronic device 600 (e.g., electronic device 101 of FIG. 1) according to various embodiments of the disclosure. According to an embodiment, the electronic device 600 may include at least one processor (e.g., first processor 610 or second processor 620), a memory 630, a display module 640, and at least one sensor 650.

The first processor 610 may control the overall operation of the electronic device 600. The second processor (e.g., low-power processor or sensor hub) 620 may process sensor information acquired through the at least one sensor 650 or an input acquired from a user without making the first processor 610 wake up in the case where the electronic device is in a sleep state (e.g., locking mode or inactive state of the display). According to an embodiment, the second processor 620 may independently control a biosensor 651, a touch sensor 652, or the display module 640.

According to various embodiments, the electronic device 600 may include the memory 630, and the memory 630 may include a general region for storing a user application or the like, or a security region for storing security-sensitive information, such as information for fingerprint sensing.

According to various embodiments, the display module 640 may include a display panel 642 including a plurality of pixels and a display driver module (e.g., display driver IC (DDI)) 641 configured to provide display information by controlling at least parts of the plurality of pixels included in the display panel 642.

According to various embodiments, the at least one sensor 650 may include the biosensor (e.g., fingerprint sensor) 651 for detecting the users fingerprint through the display module 640 or the touch sensor 652 for detecting a users touch. According to various embodiments, the biosensor 651 may include an optical fingerprint sensor (e.g., image sensor) that uses light output from the display module 640 as a light source. According to various embodiments, the biosensor 651 may use an additional light source (e.g., IR LED light source (not illustrated)) as the light source in addition to the light output by the display module.

According to various embodiments, the at least one sensor 650 may drive the plurality of pixels included in the display panel 642 through the display driver module (DDI) 641 in response to the users input. If necessary, the at least one sensor 650 may control the display panel 642. For example, the biosensor 651 may use the light emitted from the display panel 642 by controlling the display panel 642 to acquire users biometric information (e.g., fingerprint information).

FIG. 6B illustrates another example of an electronic device 600 according to various embodiments of the disclosure. According to an embodiment, the electronic device 600 may include a plurality of controllers (e.g., first controller 612, second controller 622, third controller 643, fourth controller 653, and fifth controller 660). For example, the first controller 612 may be included in the first processor 610, and the second controller 622 may be included in the second processor 620. Further, the third controller 643 may be included in the display driver module (DDI) 641 of the display module 640. The fourth controller 653 may be included in the biosensor 651 of the sensor 650. According to various embodiments, the electronic device 600 may control the first processor 610 using the first controller 612, and it may control the second processor 620 using the second controller 622. The electronic device 600 may control the display driver module 641 using the third controller 643, and it may control the biosensor 651 using the fourth controller 653.

According to various embodiments, the electronic device 600 may control the plurality of controllers (e.g., first controller 612, second controller 622, third controller 643, and fourth controller 653) using a main controller (e.g., fifth controller 660). Further, the electronic device 600 may designate the main controller, and it may control other controllers through the designated main controller. For example, the electronic device 600 may change/designate the main controller from the fifth controller 660 that is the main controller to the first controller 612. The electronic device 600 may control other controllers using the changed/designated main controller.

According to various embodiments, the electronic device 600 may directly control modules of the electronic device 600 using one controller. For example, the electronic device 600 may control the second processor 620, the memory 630, the display module 640, and/or the at least one sensor 650 using the first controller 612 included in the first processor 610. According to various embodiments, one controller may control the display module 640 and the at least one sensor 650. For example, in the case of the optical fingerprint sensor using the display module 640 as a light source, the display module 640 and the at least one sensor 650 may be controlled by the one controller, and the users biometric information (e.g., fingerprint information) may be easily acquired.

According to various embodiments of the disclosure, an electronic device may include a biosensor; a processor, a display panel including a first region corresponding to the biosensor and a touch sensor including a second region formed at least partly adjacent to at least a part of the first region; and one or more control circuits configured to control the touch sensor, wherein the processor is configured to acquire a users input based on the first region and the second region, identify an input shape corresponding to the users input, and acquire biometric information corresponding to the users input through a control of the biosensor if the identified input shape satisfies a designated condition.

According to various embodiments of the disclosure, the processor may be configured to satisfy the designated condition if the identified input shape is detected in the first region, but is not detected in the second region.

According to various embodiments of the disclosure, the processor may be configured to satisfy the designated condition if the identified input shape is detected in the first region, and is detected in at least a configured part of the second region.

According to various embodiments of the disclosure, the processor may be configured to recognize the users input as a touch input onto the first region or the second region if the shape satisfies another designated condition.

According to various embodiments of the disclosure, the processor may be configured to disregard the users input in a low-power state.

According to various embodiments of the disclosure, the processor may be configured to activate the display panel in a low-power state if the acquired users input corresponds to a configured pattern or shape, or if a pressure intensity corresponding to the users input exceeds a configured pressure intensity.

According to various embodiments of the disclosure, the processor may be configured to activate the biosensor in a low-power state if the acquired users input corresponds to a configured pattern or shape, or if a pressure intensity corresponding to the users input exceeds a configured pressure intensity.

According to various embodiments of the disclosure, the processor may be configured to deactivate the biosensor if the users input is acquired through an unconfigured part of the second region.

According to various embodiments of the disclosure, the processor may be configured to display a notification message or to control and guide the display panel in order for the users input to satisfy the designated condition.

According to various embodiments of the disclosure, the processor may be configured to make a light source corresponding to the users input emit light and to acquire the biometric information reflected from the users input through the control of the biosensor.

According to various embodiments of the disclosure, the light source emitting the light may be a light source of which luminance, a green value, and a red value are adjusted.

According to various embodiments of the disclosure, the processor may be configured to compare the acquired biometric information with biometric information stored in a memory, and authenticate a user based on the result of the comparison.

Figure 7:
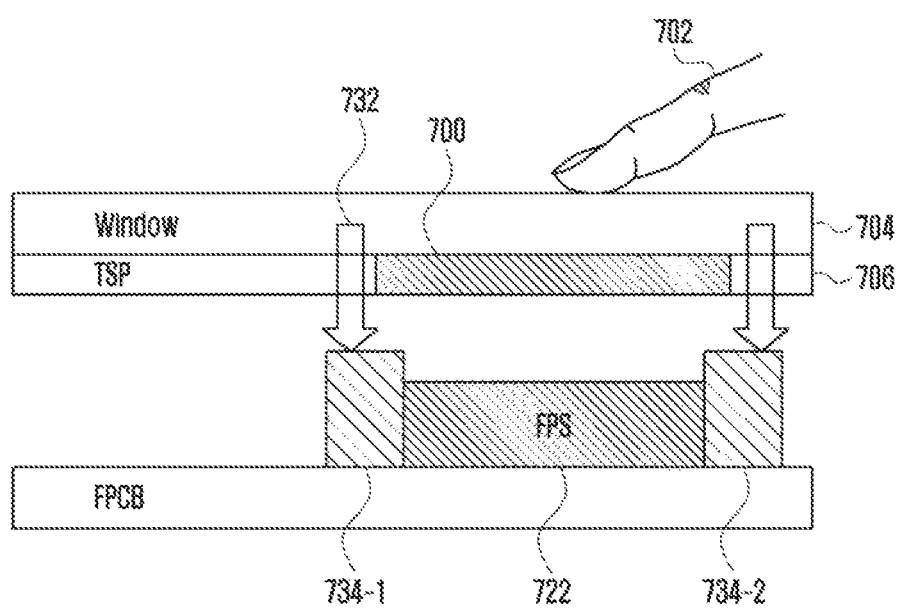
FIG. 7 is a diagram illustrating the structure of main constituent parts of an electronic device according to various embodiments of the disclosure.

FIG. 7 is a diagram illustrating the structure of main constituent parts of an electronic device according to various embodiments of the disclosure.

According to various embodiments of the disclosure, a users fingerprint may be recognized in a high brightness mode (HBM) that is a mode for variably adjusting brightness of a display. According to various embodiments, an electronic device (e.g., electronic device 600 of FIGS. 6A and 6B) may detect a users touch input through a touch screen panel (TSP) (e.g., display panel), and it may activate the HBM if the touch input satisfies a configured condition. According to various embodiments, the electronic device 600 may receive pressure corresponding to the users touch input through a pressure sensor (force sensor), and if the pressure satisfies the configured condition, the electronic device 600 may activate the HBM or the fingerprint sensor.

FIG. 7 schematically illustrates constituent parts corresponding to the display. With reference to FIG. 7, a display (e.g., display module 640 of FIGS. 6A and 6B) of the electronic device 600 may include a glass 704, a touch screen panel (TSP) 706 deployed below the glass 704, or a fingerprint sensor (FPS) 722 (e.g., biosensor 651 of FIGS. 6A and 6B). The electronic device 600 may detect fingerprint information corresponding to a user's touch input 702 in the high brightness mode (HBM) through a fingerprint recognition region 700 of the display. In the electronic device according to an embodiment of the disclosure, a fingerprint recognition region 700 having a size larger than the size of the fingerprint sensor 722 may be formed, and the user's fingerprint information may be detected based on the fingerprint recognition region 700. For example, the electronic device 600 may temporarily emit bright light based on the fingerprint recognition region 700 in the HBM. The electronic device 600 may control the brightness of the light through division of a light emission region into a first region and a second region in accordance with the brightness and luminance of the light.

According to various embodiments, the electronic device 600 may emit the light through configuration of at least one of luminance, and red, green, and blue values to be higher than other values in the HBM. For example, if the users touch is recognized, it may be possible to emit the light of which the green value is configured to be higher than other values. The electronic device 600 may configure high power consumption in the HBM to make the partial region of the display corresponding to the fingerprint recognition region 700 emit the light. The emitted light may be reflected by the users fingerprint and it may be transferred to the fingerprint sensor 722 of the electronic device 600. The electronic device 600 may acquire the reflected light through the fingerprint sensor 722, and it may acquire an image corresponding to the users fingerprint using the reflected light. The electronic device 600 may acquire information on the users fingerprint through analysis of the image.

According to various embodiments, pressure sensors 734-1 and 734-2 may be built in the electronic device 600. The electronic device 600 may measure pressure 732 generated through the pressure sensors 734-1 and 734-2, and if the pressure 732 satisfies a predetermined reference, the electronic device 600 may activate the HBM. The electronic device 600 may measure the intensity of the pressure 732 corresponding to the user's touch input. If the intensity of the pressure 732 satisfies the predetermined reference, the electronic device 600 may activate the HBM, and it may acquire the user's fingerprint corresponding to the user's touch input.

According to various embodiments, if the user's touch input is detected, the electronic device 600 may perform filtering to determine whether the user's touch input is a user's unintended touch input (false touch). If it is determined that the user's touch input is a normal touch input, the electronic device 600 may activate the HBM by controlling the brightness of the display or the power. The electronic device 600 may acquire the user's fingerprint corresponding to the user's touch input in the HBM, and it may perform a user authentication function based on the acquired fingerprint.

Figure 8:
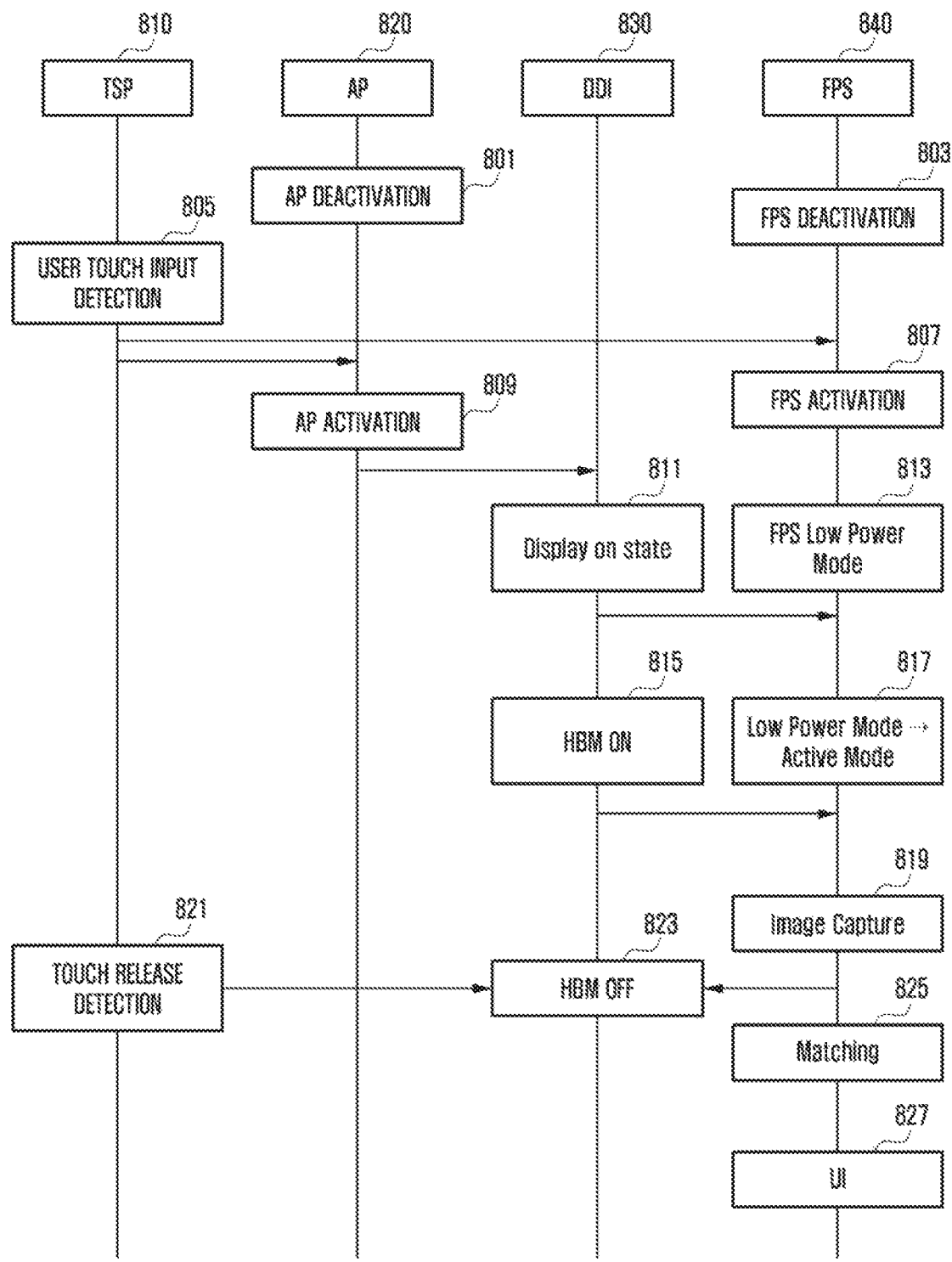
FIG. 8 is a flowchart explaining operations of main constituent parts in the case where a fingerprint input is detected in a state where a display is turned off according to various embodiments of the disclosure.

FIG. 8 is a flowchart explaining operations of main constituent parts in the case where a fingerprint input is detected in a state where a display is turned off according to various embodiments of the disclosure.

With reference to FIG. 8, operations of respective main constituent parts are illustrated corresponding to an operation of activating the HBM in a state where the display is turned off. The main constituent parts illustrated in FIG. 8 may include a touch screen panel (TSP) 810, an application processor (AP) 820, a display driver module (DDI) 830, or a fingerprint sensor (FPS) 840.

At operation 801, the AP 820 may be in a sleep state (e.g., inactive state). At operation 803, the fingerprint sensor (FPS) 840 may also be in an inactive state. The electronic device may be in a state where the display is turned off. At operation 805, the electronic device may detect a users touch input through the TSP 810. If the users touch input satisfies a predetermined condition, the electronic device may activate the AP 820 and the FPS 840. For example, if the users touch input coincides with a predetermined touch pattern or an input shape, or if pressure that is higher than a predetermined pressure is generated, the electronic device may activate the AP 820 and the FPS 840. At operation 809, the electronic device may activate the AP 820, and at operation 807, the electronic device may activate the FPS 840.

If the AP 820 is activated at operation 809, the AP 820, at operation 811, may activate a display. Further, if the FPS 840 is activated at operation 807, the electronic device, at operation 813, may enter into a FPS low-power mode.

At operation 815, the electronic device may activate a high brightness mode (HBM), and at operation 817, the electronic device may change the mode of the FPS 840 from a low-power mode to an active mode. According to various embodiments, the electronic device may acquire users fingerprint information corresponding to the users touch input in the HBM, and it may perform a user authentication function based on the fingerprint information. At operation 819, the electronic device may capture the users fingerprint information corresponding to the users touch input through the FPS 840. After capturing the users fingerprint information, the electronic device, at operation 823, may deactivate the HBM by controlling the DDI 830. According to various embodiments, even if the users touch input is released at operation 821, the electronic device may deactivate the HBM by controlling the DDI 830.

At operation 825, the electronic device may compare the captured users fingerprint information with fingerprint information stored in the memory, and it may notify the user of the result of the comparison. For example, if the users fingerprint information coincides with the stored fingerprint information, the electronic device, at operation 827, may display a configured user interface (UI). If the users fingerprint information does not coincide with the stored fingerprint information, the electronic device may provide an authentication error message to the user. According to various embodiments, in accordance with the completion of the user authentication, the electronic device may release the locking function of the electronic device, or it may perform a configured application function.

Figure 9:
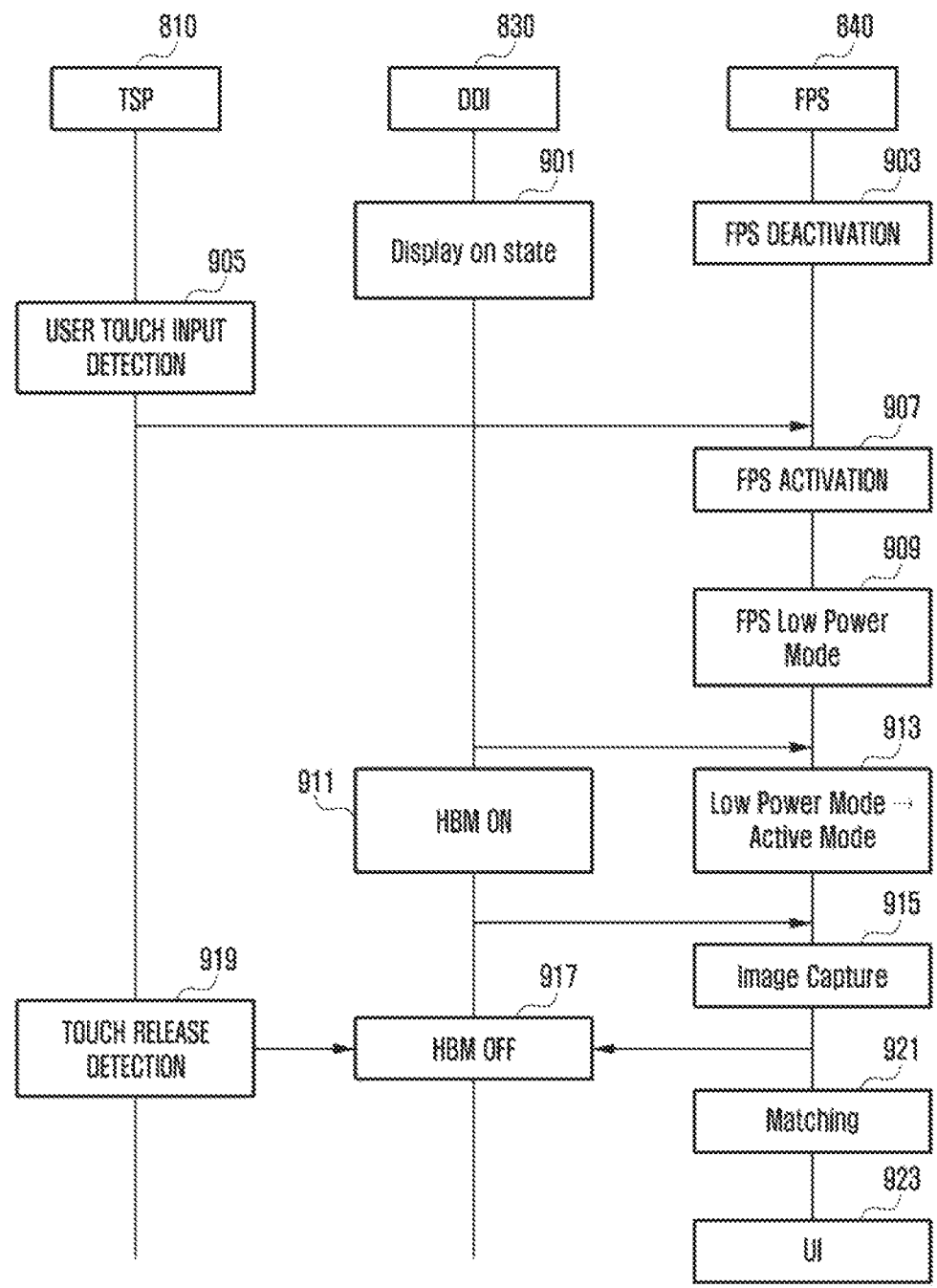
FIG. 9 is a flowchart explaining operations of main constituent parts in the case where a fingerprint input is detected in a state where a display is turned on according to various embodiments of the disclosure.

FIG. 9 is a flowchart explaining operations of main constituent parts in the case where a fingerprint input is detected in a state where a display is turned on according to various embodiments of the disclosure.

With reference to FIG. 9, in a state where the display is turned on, the AP 820 of FIG. 8 may be maintained in an active state, and the AP 820 may be omitted.

At operation 901, the electronic device may maintain a state where the display is turned on by controlling the DDI 830. At operation 903, the FPS 903 may be in an inactive state. At operation 905, the electronic device may detect the users touch input through the TSP 810. For example, the electronic device may identify an input shape corresponding to the detected users touch input, and it may determine whether the input shape coincides with a configured input shape. If the input shape coincides with the configured input shape, the electronic device, at operation 907, may activate the FPS 840. At operation 909, the electronic device may activate an FPS low-power mode.

At operation 911, the electronic device may activate the HBM by controlling the DDI 830, and at operation 913, the electronic device may change the mode of the FPS 840 from a low-power mode to an active mode. According to various embodiments, the electronic device may acquire users fingerprint information corresponding to the users touch input in the HBM. At operation 915, the electronic device may capture the users fingerprint information corresponding to the users touch input through the FPS 840. After capturing the users fingerprint information, the electronic device, at operation 917, may deactivate the HBM by controlling the DDI 830. According to various embodiments, even if the users touch input is released at operation 919, the electronic device may deactivate the HBM by controlling the DDI 830.

At operation 921, the electronic device may compare the captured users fingerprint information with fingerprint information stored in the memory, and it may notify the user of the result of the comparison. For example, if the users fingerprint information coincides with the stored fingerprint information, the electronic device, at operation 923, may display a configured user interface. If the users fingerprint information does not coincide with the stored fingerprint information, the electronic device may provide an authentication error message to the user.

Figure 10:
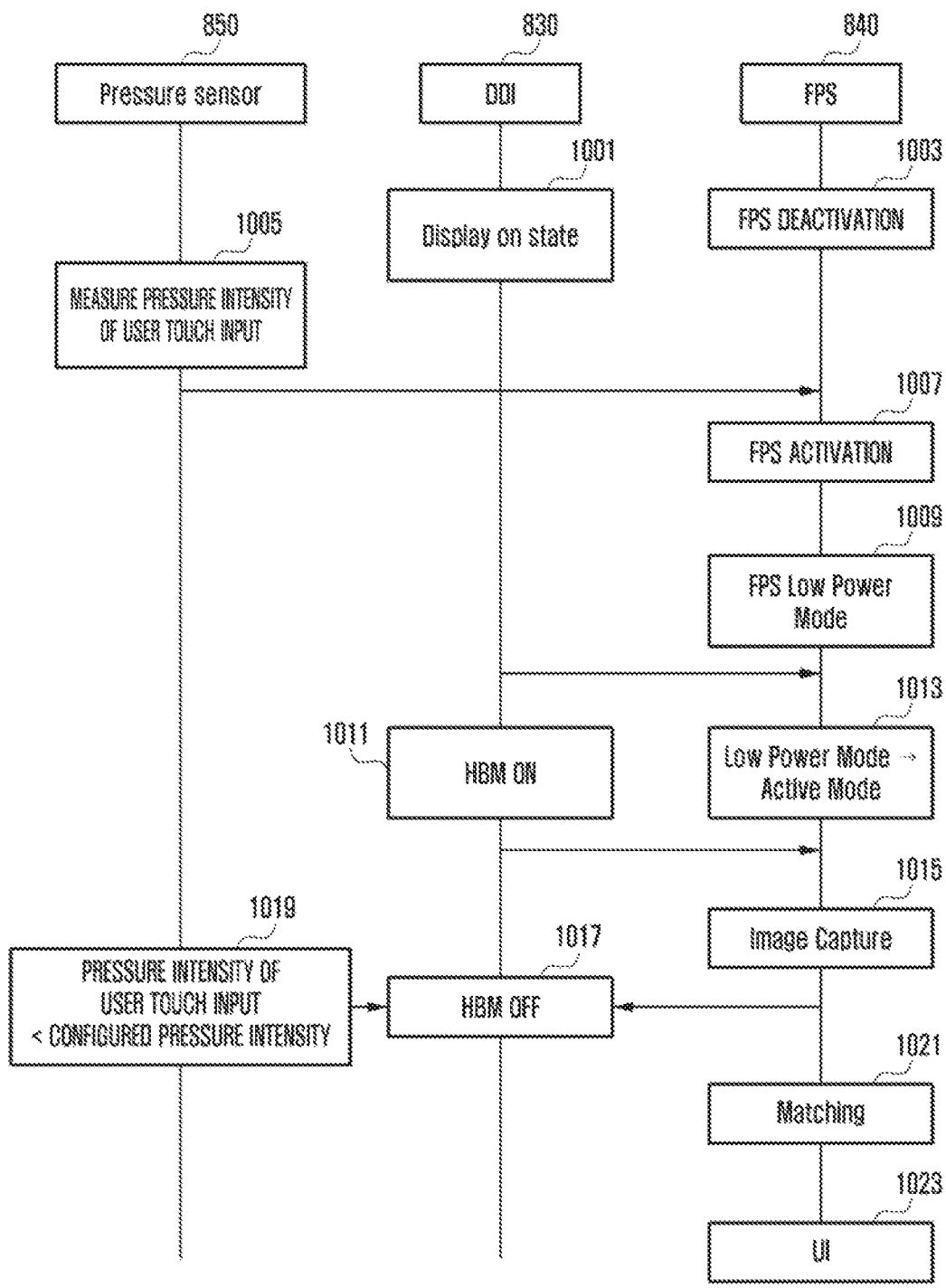
FIG. 10 is a flowchart explaining an operation of detecting a fingerprint input based on a touch pressure in a state where a display is turned on according to various embodiments of the disclosure.

FIG. 10 is a flowchart explaining an operation of detecting a fingerprint input based on a touch pressure in a state where a display is turned on according to various embodiments of the disclosure.

With reference to FIG. 10, the TSP 810 illustrated in FIG. 9 is omitted, and a pressure sensor 850 is illustrated. In FIG. 10, it may be possible to measure a pressure intensity corresponding to the users touch input based on the pressure sensor 850, and to activate the high brightness mode (HBM) if the pressure intensity satisfies a predetermined condition.

Operations 1001 and 1003 correspond to operations 901 and 903 of FIG. 9. At operation 1005, the electronic device may measure the pressure intensity of the users touch input using the pressure sensor 850. If the measured pressure intensity exceeds a predetermined pressure intensity value (if the measured pressure intensity satisfies the predetermined condition), the electronic device, at operation 1007, may activate the FPS 840.

Operations 1007 to 1017 correspond to operations 907 to 917 of FIG. 9. At operation 1019, the electronic device may identify whether the pressure intensity of the users touch input is lower than the predetermined pressure intensity value using the pressure sensor 850. If the pressure intensity is lower than the predetermined pressure intensity value, the electronic device, at operation 1017, may deactivate the HBM. According to various embodiments, the electronic device may determine whether to activate the HBM corresponding to the pressure intensity of the users touch input.

At operation 1021, the electronic device may compare the users fingerprint information captured at operation 1015 with the fingerprint information stored in the memory, and it may notify the user of the result of the comparison. For example, if the users fingerprint information coincides with the stored fingerprint information, the electronic device, at operation 1023, may display a configured user interface. If the users fingerprint information does not coincide with the stored fingerprint information, the electronic device may provide an authentication error message to the user.

The electronic device according to various embodiments may measure the pressure intensity corresponding to the users touch input through the pressure sensor 850, and if the pressure intensity exceeds the predetermined pressure intensity value, the electronic device may activate the HBM or the fingerprint sensor. The pressure sensor 850 according to various embodiments may detect the pressure in an always on state, or the pressure sensor may be activated by the TSP (not illustrated) 810 to measure the pressure intensity corresponding to the users input.

Figure 11:
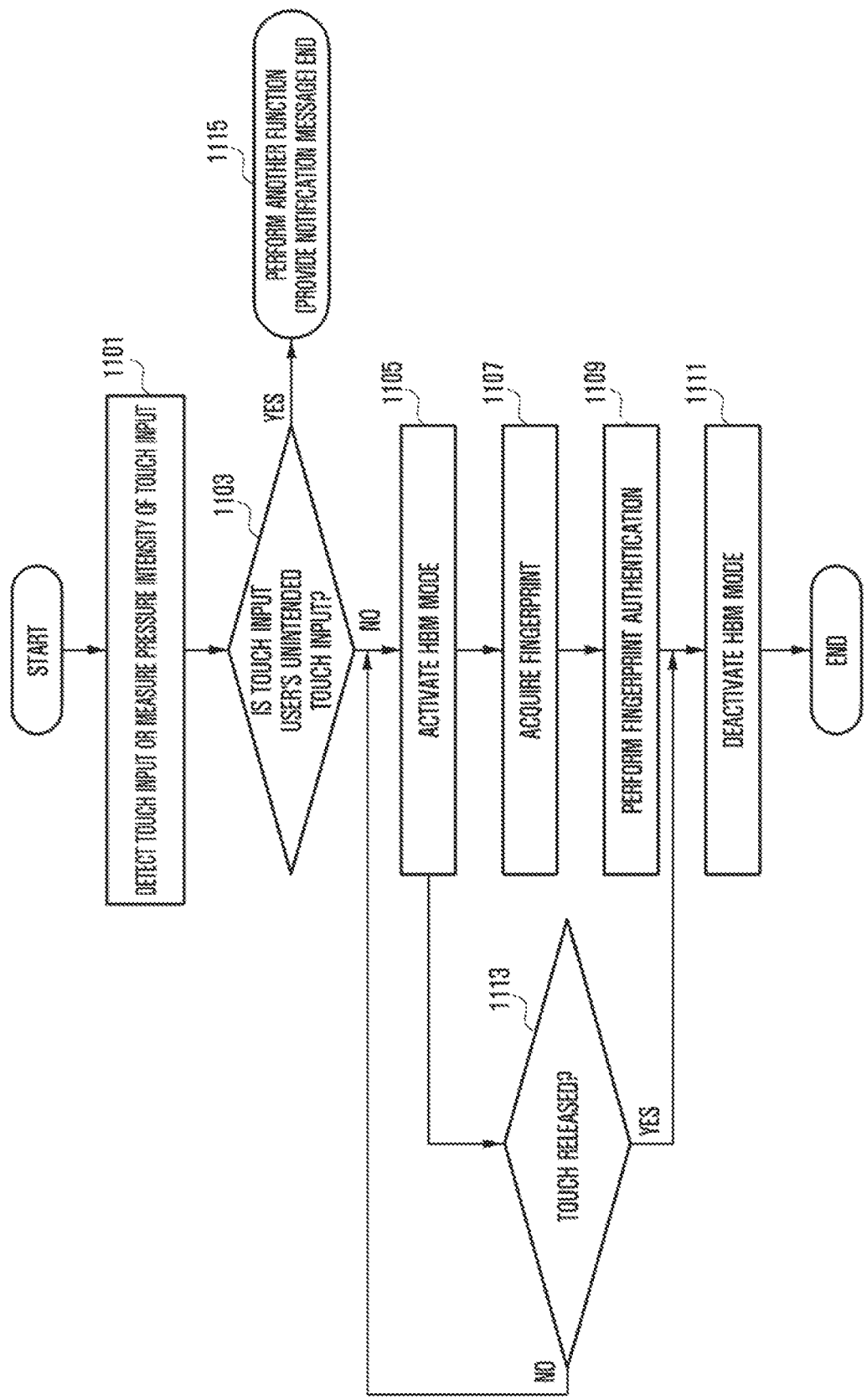
FIG. 11 is a flowchart explaining a method for recognizing a fingerprint using a fingerprint sensor associated with a display according to various embodiments of the disclosure.

FIG. 11 is a flowchart explaining a method for recognizing a fingerprint using a fingerprint sensor associated with a display according to various embodiments of the disclosure.

At operation 1101, a processor (e.g., first processor 610 or second processor 620 of FIG. 6A) of an electronic device (e.g., electronic device 600 of FIG. 6A) may detect a users touch input or it may measure a pressure intensity corresponding to the users touch input. For example, the electronic device 600 may detect a touch pattern corresponding to the touch input, a touch location, or an input shape. The input shape may be a specific shape corresponding to the users touch input. Hereinafter, although it is described that the electronic device 600 is controlled by the first processor 610, the electronic device 600 may be controlled by the second processor 620 in a low-power mode (e.g., locking mode, sleep mode, or display inactive mode).

At operation 1103, the electronic device 600 (e.g., first processor 610 or second processor 620) may identify whether the touch input is a false touch input (e.g., users unintended touch input). For example, the electronic device 600 may determine and form a partial region of the display (e.g., display module 640) as a fingerprint recognition region for recognizing a users fingerprint. The processor (e.g., first processor 610 or second processor 620, hereinafter, the processor is described as the first processor 610) of the electronic device 600 may identify whether the users touch input is the false touch input based on the formed fingerprint recognition region. Further, the first processor 610 of the electronic device 600 may determine and form a fingerprint error region for determining that the users touch input is false corresponding to a partial region of the display. The first processor 610 may determine the fingerprint error region based on the fingerprint recognition region. The first processor 610 may identify that the users touch input is false based on the formed fingerprint error region. The fingerprint recognition region and the fingerprint error region may be formed adjacent to each other, and the first processor 610 may determine the users touch input that deviates from the fingerprint error region as the false touch input. If it is determined that the users touch input is the false touch input, the first processor 610, at operation 1115, may perform another function. For example, the first processor 610 may provide a notification message for notifying that the touch input is false to the user. The notification message may include a popup message, a voice message, signal sound, brightness change, and vibration. For example, if the touch input is false, the electronic device 600 may perform a general touch function without performing the fingerprint recognition operation, or it may perform UI control or function control corresponding to an application. According to an embodiment, the electronic device, at operation 1101, may identify a direction, pressure, or location of the touch in order to determine whether the users touch input is a users unintended touch input (false touch).

If the users touch input is a correct touch input (e.g., touch input for fingerprint recognition) at operation 1103, the electronic device 600 (e.g., first processor 610 or second processor 620) may activate the high brightness mode (HBM) at operation 1105. For example, the first processor 610 may activate the HBM based on the fingerprint recognition region. The first processor 610 may acquire the users fingerprint in the HBM. The first processor 610 may adjust the brightness of a partial region of the display in the HBM, or it may control the display so that a light source emits light around the green or red value. According to an embodiment of the disclosure, the electronic device may control to heighten the luminance of the partial region of the display or to heighten the power applied to the partial region of the display in the HBM. The first processor 610 may acquire the users fingerprint by controlling the light source.

At operation 1107, the first processor 610 may acquire the users touch input based on the fingerprint recognition region, and it may acquire the users fingerprint corresponding to the users touch input. At operation 1109, the first processor 610 may perform a fingerprint authentication function based on the acquired users fingerprint. For example, the first processor 610 may acquire the users fingerprint in a state where the users fingerprint information is stored in the memory (e.g., memory 630 of FIG. 6A). The first processor 610 may perform the fingerprint authentication function through comparison of the acquired users fingerprint with the fingerprint information stored in the memory 630. After performing the fingerprint authentication function, the first processor 610, at operation 1111, may deactivate the HBM.

According to another embodiment, at operation 1113, the first processor 610 may determine whether the users touch input is released (ended). For example, if the touch input is released, the first processor 610, at operation 1111, may deactivate the activated HBM. If the touch input is not released, the first processor 610 may perform the fingerprint authentication function through acquisition of the users fingerprint in a state where the HBM is activated.

According to various embodiments, in a low-power mode (e.g., locking mode, sleep mode, or display inactive mode), the operations illustrated in FIG. 11 may be controlled by the second processor 620.

Figure 12:
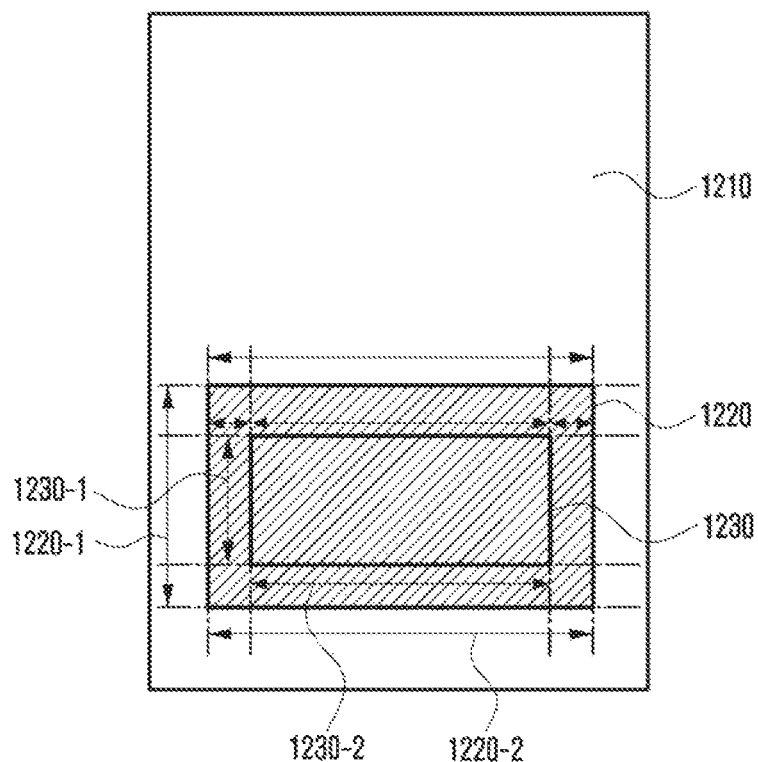
FIG. 12 is a diagram illustrating a fingerprint recognition region formed corresponding to a partial region of a display according to various embodiments of the disclosure.

FIG. 12 is a diagram illustrating a fingerprint recognition region formed corresponding to a partial region of a display according to various embodiments of the disclosure.

FIG. 12 illustrates a display 1210 of an electronic device. With reference to FIG. 12, the electronic device 600 may include a fingerprint sensor (FPS) 1230 corresponding to a part of the display 1210 (e.g., 410 of FIG. 4). The fingerprint sensor 1230 may be deployed on a lower end portion of the display 1210. The fingerprint sensor 1230 may be provided in the form of a rectangle having a vertical length 1230-1 and a horizontal length 1230-2, but it is not limited thereto. If the HBM is activated, the electronic device 600 according to various embodiments may form a fingerprint recognition region (HBM region) 1220 (e.g., 420 of FIG. 4) based on the fingerprint sensor 1230. The fingerprint recognition region 1220 may be formed adjacent to the fingerprint sensor 1230 based on the size of the fingerprint sensor 1230, and it may be formed to be larger than the fingerprint sensor 1230. For example, the fingerprint recognition region 1220 may be formed to have horizontal and vertical lengths 1220-1 and 1220-2 that are 1 to 2 mm larger than those of the fingerprint sensor 1230. The fingerprint recognition region 1220 may be a region in which the electronic device 600 can detect the users touch input. With reference to FIG. 12, the fingerprint recognition region 1220 may be formed in a rectangular shape having a vertical length 1220-1 and a horizontal length 1220-2, but it is not limited thereto.

Figure 13:
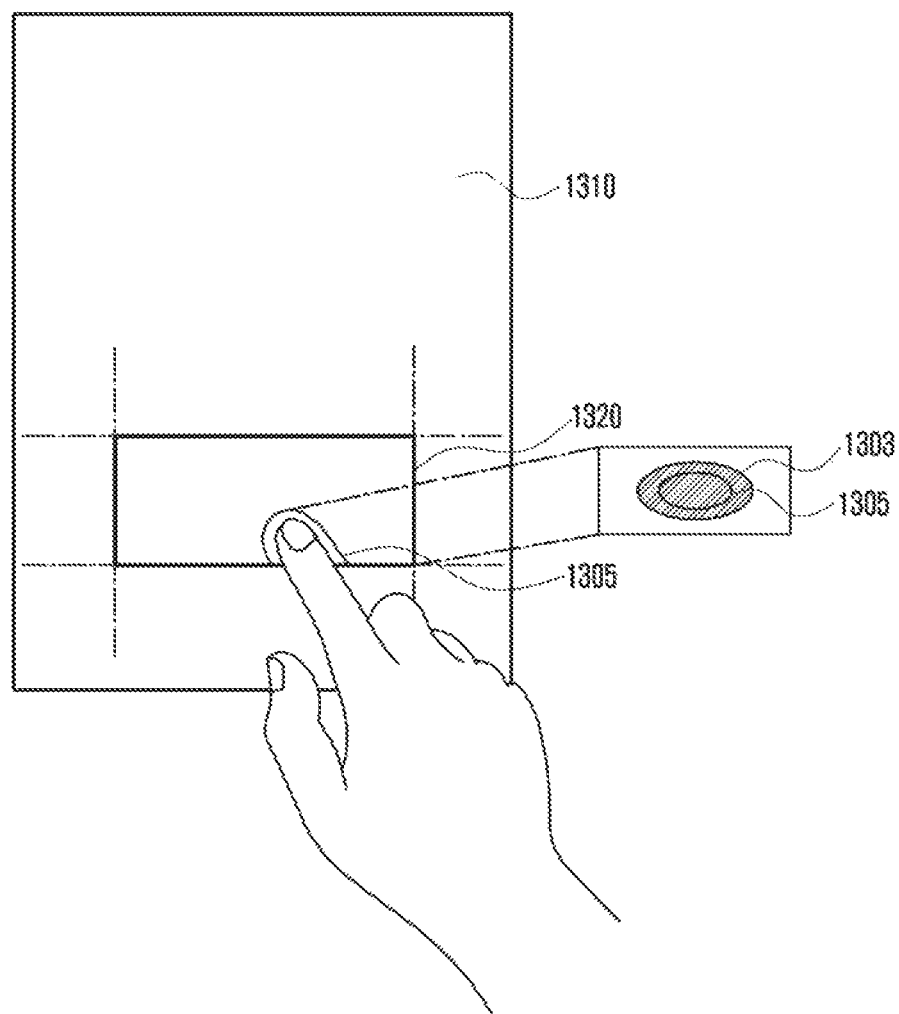
FIG. 13 is a diagram illustrating a process of detecting a users input based on a fingerprint recognition region according to various embodiments of the disclosure.

FIG. 13 is a diagram illustrating a process of detecting a users input based on a fingerprint recognition region according to various embodiments of the disclosure.

With reference to FIG. 13, an electronic device may include a fingerprint sensor 1320 corresponding to a part of a display 1310, and it may detect users touch input 1305 based on the fingerprint sensor. The electronic device may determine a fingerprint recognition region 1303 based on the users touch input 1305. The electronic device according to various embodiments may variably change the fingerprint recognition region based on the users touch input. For example, the electronic device may variably configure the fingerprint recognition region 1303 corresponding to the users touch input 1305, and it may control to change the fingerprint recognition region 1303 corresponding to the change of the users touch input 1305.

Figure 14:
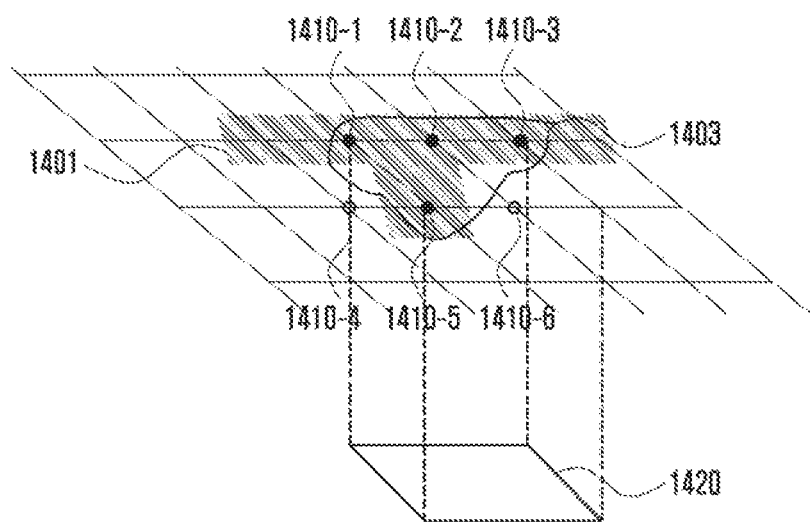
FIG. 14 is a diagram illustrating a process of recognizing a users fingerprint according to various embodiments of the disclosure.

FIG. 14 is a diagram illustrating a process of recognizing a users fingerprint according to various embodiments of the disclosure.

With reference to FIG. 14, an electronic device 600 may detect a users touch input 1403 based on a panel (e.g., panel 642 of FIG. 6A) of a display module (display module 640 of FIG. 6A). For example, the electronic device 600 may identify the users touch input 1403 based on points 1410-1, 1410-2, 1410-3, and 1410-5 at which the users touch input is detected on the panel and points 1410-4 and 1410-6 at which the users touch input is not detected. The electronic device 600 according to various embodiments may configure a partial region of a display as a fingerprint recognition region 1410 corresponding to the identified users touch input 1403. The electronic device 600 may acquire an image corresponding to a users fingerprint with respect to the users touch input 1403 through a fingerprint sensor 1420. The electronic device 600 according to various embodiments may identify the users fingerprint through comparison of the acquired image with fingerprint information stored in a memory.

According to an embodiment of the disclosure, if a high brightness mode (HBM) that is a mode for variably adjusting the brightness of the display is activated, the electronic device 600 may determine a HBM target region (e.g., fingerprint recognition region) 1401. For example, the HBM target region 1401 may be processed to be bright on the display, and the remaining region may be processed to be dark in comparison with the HBM target region 1401. According to an embodiment of the disclosure, the processing of the HBM target region 1401 is not limited to the HBM, but the processing of the HBM target region 1401 may be performed based on various factors, such as color, luminance, and applied power.

Figure 15:
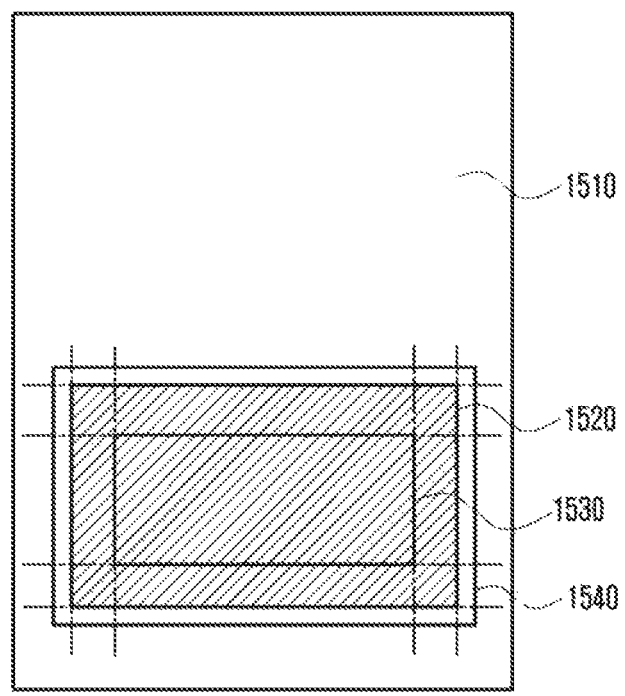
FIG. 15 is a diagram illustrating a fingerprint recognition region and a fingerprint error region according to various embodiments of the disclosure.

FIG. 15 is a diagram illustrating a fingerprint recognition region and a fingerprint error region according to various embodiments of the disclosure.

With reference to FIG. 15, an electronic device may include a fingerprint sensor 1530 corresponding to a part of a display 1510, and it may determine a fingerprint recognition region 1530 based on the fingerprint sensor 1530. The electronic device may form a fingerprint error region 1540 in an outer region based on the fingerprint recognition region 1530. The electronic device according to various embodiments may determine a false touch (e.g., false touch input or abnormal touch input occurring through a touch of another body part that is not a users fingerprint) based on the fingerprint error region 1540. The electronic device according to various embodiments may make a light source for fingerprint sensing emit light corresponding to the fingerprint recognition region 1530.

In the electronic device according to various embodiments, the fingerprint error region (e.g., false touch prevention guide region) 1540 may be formed adjacent to an outside of the fingerprint recognition region 1530. If the users touch input occurs corresponding to the fingerprint error region 1540, the electronic device according to various embodiments may determine that the touch input is an abnormal touch input, and it may not perform the fingerprint sensing function. The electronic device may not perform the fingerprint sensing function, or it may not activate the fingerprint sensor 1530. The electronic device according to various embodiments may determine whether the users touch input is normal based on configured angle, location, direction and shape.

Figure 16:
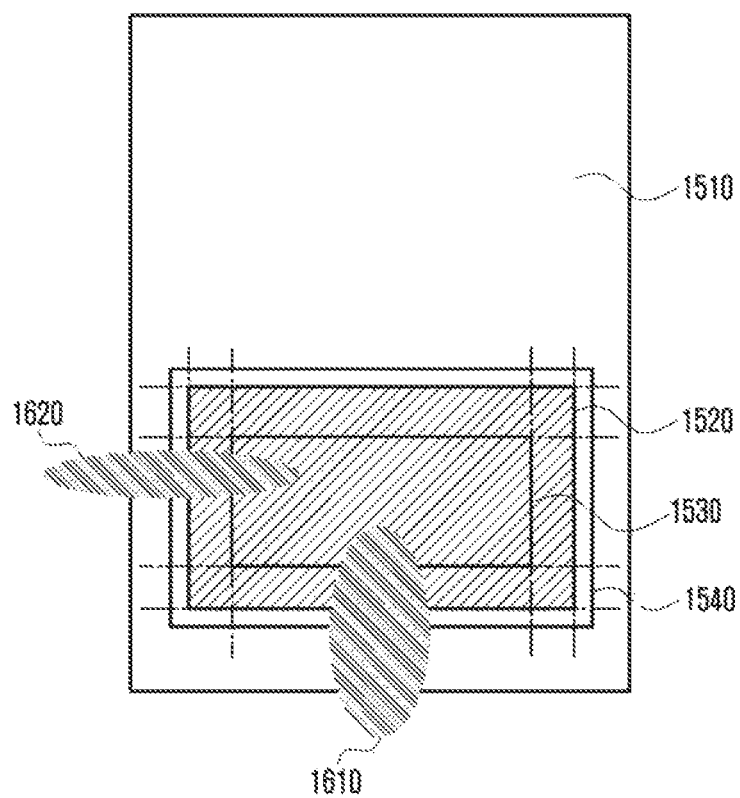
FIG. 16 is a diagram illustrating a process of recognizing a fingerprint based on a fingerprint recognition region and a fingerprint error region according to various embodiments of the disclosure.

FIG. 16 is a diagram illustrating a process of recognizing a fingerprint based on a fingerprint recognition region and a fingerprint error region according to various embodiments of the disclosure.

With reference to FIG. 16, an electronic device may determine whether a users touch input is a users unintended touch input (false input) based on the fingerprint recognition region 1530 and the fingerprint error region (e.g., false touch prevention guide region) 1540. For example, if a users first touch input 1610 occurs through a partial region of the fingerprint error region 1540, the electronic device may determine that the users touch input does not correspond to the users unintended touch input, and it may perform a user authentication function. In contrast, if a users second touch input 1620 occurs through the partial region of the fingerprint error region 1540, the electronic device may determine that the user's touch input is the users unintended touch input, and it may not perform the user authentication function. The electronic device may determine that the users touch input is not the users unintended touch input only with respect to the users touch input through a lower end portion of the fingerprint error region 1540. Further, if the touch does not occur corresponding to the fingerprint error region 1540, but the touch input corresponding to the fingerprint recognition region 1530 occurs, the electronic device may determine that the touch input is a normal touch input.

The electronic device according to various embodiments may determine the fingerprint error region 1540 corresponding to the fingerprint recognition region 1530, and it may exclude parts (e.g., upper end part, lower end part, left part, and right part) of the fingerprint error region 1540 from the fingerprint error region 1540.

The electronic device according to various embodiments may determine whether the users touch input is the users unintended touch input based on the fingerprint recognition region 1530 and the fingerprint error region 1540, and if the users touch input is not the users unintended touch input, the electronic device may perform the user authentication function based on the users fingerprint corresponding to the users touch input.

According to various embodiments of the disclosure, a method for controlling a biosensor associated with a display may include acquiring a users input based on a first region corresponding to the biosensor and a second region corresponding to a touch sensor and adjacent to at least a part of the first region; identifying an input shape corresponding to the users input; and acquiring biometric information corresponding to the users input through a control of the biosensor if the identified input shape satisfies a designated condition.

According to various embodiments of the disclosure, the method may further include satisfying the designated condition if the identified input shape is detected in the first region, but is not detected in the second region.

According to various embodiments of the disclosure, the method may further include satisfying the designated condition if the identified input shape is detected in the first region, and is detected in at least a configured part of the second region.

According to various embodiments of the disclosure, the method may further include recognizing the users input as a touch input onto the first region or the second region if the shape satisfies another designated condition.

According to various embodiments of the disclosure, the method may further include activating the display panel in a low-power state if the acquired users input corresponds to a configured pattern or shape, or if a pressure intensity corresponding to the users input exceeds a configured pressure intensity.

According to various embodiments of the disclosure, the method may further include activating the biosensor in a low-power state if the acquired users input corresponds to a configured pattern or shape, or if a pressure intensity corresponding to the users input exceeds a configured pressure intensity.

According to various embodiments of the disclosure, the method may further include deactivating the biosensor if the users input is acquired through an unconfigured part of the second region.

According to various embodiments of the disclosure, the method may further include displaying a notification message or controlling and guiding the display panel in order for the users input to satisfy the designated condition.

According to various embodiments of the disclosure, acquiring the biometric information may include making a light source corresponding to the users input emit light, and acquiring the biometric information reflected from the users input through the control of the biosensor.

According to various embodiments of the disclosure, the method may further include comparing the acquired biometric information with biometric information stored in a memory, and authenticating a user based on the result of the comparison.

The term "module" as used herein may include a unit consisting of hardware, software, or firmware, and may, for example, be used interchangeably with the term "logic", "logical block", "component", "circuit", or the like. The "module" may be an integrated component or a minimum unit for performing one or more functions or a part thereof. The "module" may be implemented mechanically or electronically, and may include, for example, an Application-Specific Integrated Circuit (ASIC) chip, a Field-Programmable Gate Array (FPGA), or a programmable logic device, which is known or is to be developed in the future, for performing certain operations. At least some of devices (e.g., modules or functions thereof) or methods (e.g., operations) according to various embodiments may be implemented as instructions which are stored a computer-readable storage medium (e.g., the memory 130) in the form of a program module. If the instructions are executed by a processor, the processor may perform a function corresponding to the instructions. The computer-readable storage medium may include a hard disk, a floppy disk, a magnetic medium (e.g., a magnetic tape), optical media (e.g., CD-ROM, DVD), magneto-optical media (e.g., a floptical disk), internal memory, etc. The instructions may include code compiled by a complier or code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. An electronic device comprising:
a biosensor;
a display panel including a first region including the biosensor and a second region formed at least partially adjacent to at least a part of the first region; and
a processor operatively connected to the biosensor and the display panel,
wherein the processor is configured to:
acquire a user's input based on the first region and the second region while the biosensor is deactivated,
identify an input shape corresponding to the user's input,
activate the biosensor if the input shape coincides with a configured input shape, in response to identifying the input shape, control the display panel so that a sub-region within the first region is displayed brighter than a remaining region of the display panel, wherein a location of the sub-region coincides with a location of the biosensor and a location of the user's input, and wherein the sub-region has a shape corresponding to the input shape and is larger than the input shape in at least one dimension, acquire biometric information corresponding to the user's input through a control of the biosensor and using light emitted in the sub-region, deactivate the biosensor if the user's input is acquired through an unconfigured part of the second region, and display a notification message, or control to display a guide on the display panel in order for the user's input to satisfy a designated condition.

2. The electronic device of claim 1, wherein the processor is configured to recognize the user's input as a touch input onto the first region or the second region if the input shape satisfies another designated condition.

3. The electronic device of claim 1, wherein the processor is configured to disregard the user's input in a low-power state.

4. The electronic device of claim 1, wherein the processor is configured to activate at least one of the display panel or the biosensor in a low-power state if the acquired user's input corresponds to a configured pattern or shape, or if a pressure intensity corresponding to the user's input exceeds a configured pressure intensity.

5. The electronic device of claim 1, wherein the processor is configured to adjust luminance, a green value, and a red value of the sub-region.

6. The electronic device of claim 1, wherein the processor is configured to compare the acquired biometric information with biometric information stored in a memory and authenticate a user based on the result of the comparison.

7. The electronic device of claim 1, wherein, to determine the sub-region, the processor is configured to:
determine a first plurality of points on the display panel at which perpendicular electrodes of a touch sensor intersect and where the user's input is detected; and
determine a second plurality of points on the display panel at which the perpendicular electrodes of the touch sensor intersect and where the user's input is not detected,
wherein the sub-region is determined to encompass the first plurality of points and avoid the second plurality of points.

8. A method for controlling a biosensor associated with a display, comprising:
acquiring a user's input based on a first region including the biosensor and a second region formed adjacent to at least a part of the first region, while the biosensor is deactivated;
identifying an input shape corresponding to the user's input;
activating, if the input shape coincides with a configured input shape, the biosensor on a display panel, wherein the display panel includes the first region and the second region,
in response to identifying the input shape, controlling the display panel so that a sub-region within the first region is displayed brighter than a remaining region of the display panel, wherein a location of the sub-region coincides with a location of the biosensor and a location of the user's input, and wherein the sub-region has a shape corresponding to the input shape and is larger than the input shape in at least one dimension;
acquiring biometric information corresponding to the user's input through a control of the biosensor and using light emitted in the sub-region;
deactivating the biosensor if the user's input is acquired through an unconfigured part of the second region; and
displaying a notification message, or controlling to display a guide on the display panel in order for the user's input to satisfy a designated condition.

9. The method of claim 8, further comprising:
recognizing the user's input as a touch input onto the first region or the second region if the input shape satisfies another designated condition.

10. The method of claim 8, further comprising:
activating at least one of the display panel or the biosensor in a low-power state if the acquired user's input corresponds to a configured pattern or shape, or if a pressure intensity corresponding to the user's input exceeds a configured pressure intensity.

11. The method of claim 8, wherein acquiring the biometric information comprises:
adjusting luminance, a green value, and a red value of the sub-region.

12. The method of claim 8, further comprising:
comparing the acquired biometric information with biometric information stored in a memory; and
authenticating a user based on the result of the comparison.

* * * * *